June 20, 1967

C. VAN GILST ET AL 3,326,187

ANIMAL FEEDING SYSTEM

Filed Sept. 20, 1965

INVENTORS.
CARL VAN GILST
ROBERT M. PEART
BY
Wolfe, Hubbard, Voit & O'sann
ATTORNEYS.

June 20, 1967 C. VAN GILST ET AL 3,326,187
ANIMAL FEEDING SYSTEM
Filed Sept. 20, 1965 2 Sheets-Sheet 2

INVENTORS.
CARL VAN GILST
ROBERT M. PEART
BY Wolfe, Hubbard, Voit & Osann
ATTORNEYS.

United States Patent Office 3,326,187
Patented June 20, 1967

3,326,187
ANIMAL FEEDING SYSTEM
Carl Van Gilst, Fort Atkinson, Wis., and Robert M. Peart, Lafayette, Ind., assignors to Purdue Research Foundation, Lafayette, Ind., a corporation of Indiana
Filed Sept. 20, 1965, Ser. No. 488,511
3 Claims. (Cl. 119—75)

This invention relates to a feeding system for animals and, more particularly, to a system which operates automatically.

The principal object of the invention is to provide a new and improved automatic feeding system which supplies both liquid and dry feed in the form of a slurry and delivers the slurry in response to the natural feeding action of the animal.

A more detailed object is to provide a system which circulates the slurry past a feeding nozzle and in which the slurry is delivered to the nozzle through a valve which is actuated by the animal as it feeds from the nozzle.

A further object is to introduce the dry feed and the liquid simultaneously into the system and to mix these components by the action of the circulating slurry.

Other objects and advantages of the invention will become apparent from the following detailed description taken in connection with the accompanying drawings, in which FIGURE 1 is a plan view of a hog barn incorporating a feeding system constructed in accordance with the present invention.

The present invention contemplates the provision of an automatic feeding system for animals, such as swine, which supplies a mixture of liquid and feed in the form of a slurry to the nozzle 10. The nozzle is arranged for the animal to place it in its mouth and, in so doing, the animal automatically actuates a valve 11 which connects the nozzle to a suitable source of slurry so that the latter is delivered through the nozzle to the animal. As a result, the ratio of liquid and feed may be controlled accurately. Moreover, this single system replaces the feed system and the watering system conventionally used prior to the invention. Also, the system of the present invention requires very little space and thereby permits efficient use of the floor space available.

Figure 1:
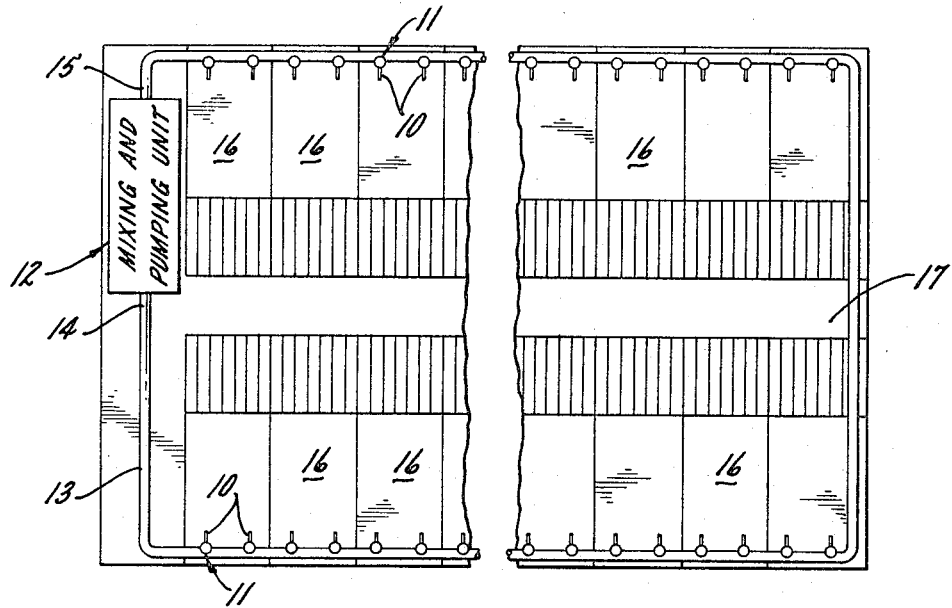

In general, the novel system comprises a mixing and pumping unit 12 and a conduit 13 with one end 14 connected to the outlet of the unit 12 and the other end 15 communicating with the inlet of the unit. As shown in FIG. 1, the conduit 13 may extend across the ends of pens 16 in a barn 17. In each pen are one or more nozzles 10 which are located so that an animal may place the nozzle in its mouth. Each nozzle is connected to the conduit 13 by an individual valve 11 which is opened automatically by the animal. The mixing and pumping unit 12 continuously circulates the slurry through the conduit so that there always is slurry adjacent each nozzle 10 to be delivered through the associated valve 11 upon the demand of the animals. As slurry is taken from the conduit 13 by the animal, it is replenished by the unit 12 to keep the conduit full of slurry.

Figure 2:
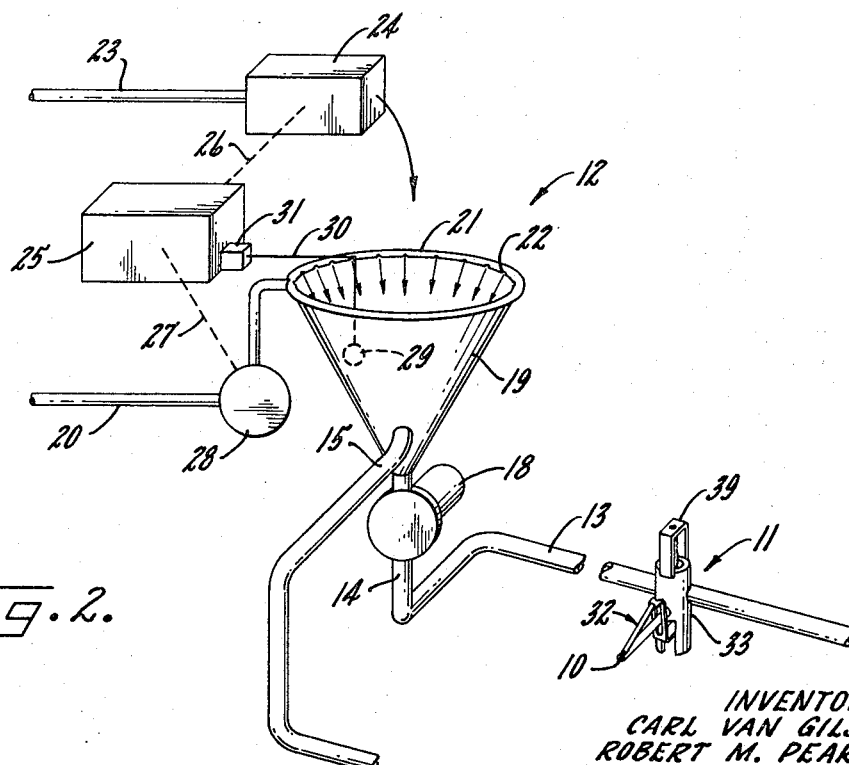
FIG. 2 is a fragmentary perspective view of the mixing and pumping portion of the system.

As illustrated in FIG. 2, the mixing and pumping unit 12 includes a pump 18 whose outlet is connected to the end 14 of the conduit 13. Above the pump is a hopper 19 with its lower end connected to the inlet of the pump. The return end 15 of the conduit 13 enters the lower end of the hopper where it mixes with the new supply of slurry for recirculation in the conduit 13. Preferably, the end 15 is directed upwardly in the hopper 19 so that the slurry returned by the conduit mixes thoroughly with the new slurry.

Herein, the slurry is composed of a mixture of water and a dry, ground feed. The water is delivered through a suitable supply pipe 20 to a circular manifold 21 extending around the upper open end of the hopper 19. The water flows through small holes 22 in the manifold and into the hopper. The feed is supplied through a pipe 23 to a measuring and dispensing device 24 which discharges the feed into the hopper.

The feed and water are delivered to the hopper 19 in a carefully measured ratio. For swine, a suitable ratio is two to three pounds of water for each pound of dry feed. This not only gives the animals adequate amounts of water and feed but also results in a slurry which is easily handled by the system and circulated through the conduit 13. The ratio is controlled by a drive mechanism 25 which has two output shafts 26 and 27. The shaft 26 drives the feed dispensing device 24 while the shaft 27 drives a meter 28 in the water supply line 20 to deliver a measured amount of water to the manifold. Feed and water are delivered to the hopper in an amount calculated to replace the slurry taken from the conduit 13 by the animals. For this purpose, the drive mechanism 25 is under the control of a float 29 which is disposed in the hopper 19 and which, through an arm 30, actuates a switch 31. The latter is opened and closed by the float to energize and deenergize the drive mechanism 25 so that feed and water are supplied in accordance with the demand of the animals.

Each valve 11 is under the control of an operator 32 (FIG. 3) which is disposed adjacent the nozzle 10 where it is actuated by the animal when the animal has the nozzle in its mouth. In accordance with one aspect of the invention, the operator 32 responds to a biting action of the animal and the valve 11 delivers a single measured charge of slurry to the nozzle each time the animal bites on the nozzle.

In the preferred embodiment of the invention, the valve 11 includes a cylindrical valve body 33 disposed alongside and at right angles to the conduit 13. An inlet port 34 in the valve body communicates with the interior of the conduit. Spaced below the inlet port is an outlet port 35 which receives the nozzle 10. In the valve body is a valve member 36 which is urged to the closed position shown in FIG. 3 by a contractile spring 37 acting between hooks 38 on the valve member and a bracket 39 rigid with the valve body.

Figure 4:
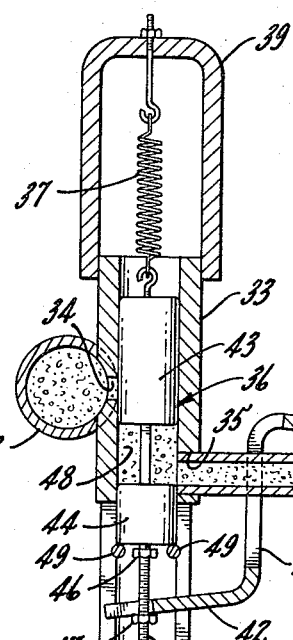
FIG. 4 is a view similar to FIG. 3 but shows the parts in an intermediate position.
Figure 5:
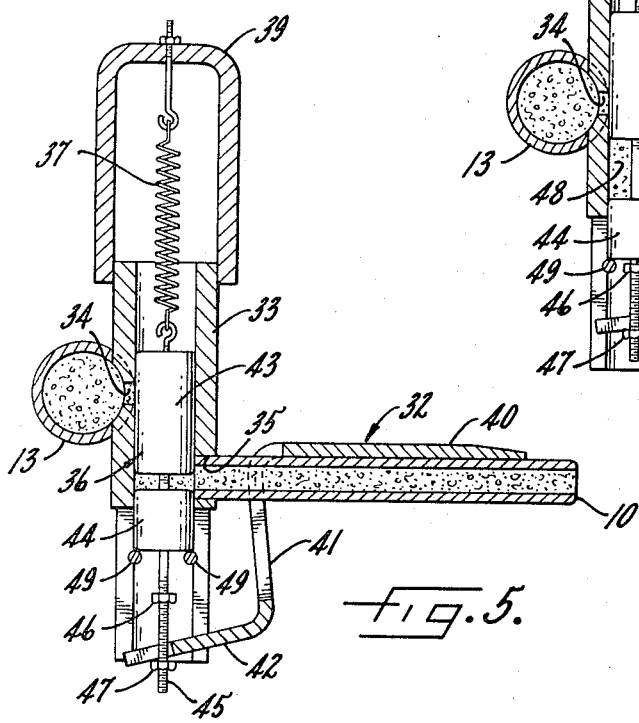
FIG. 5 is a view similar to FIG. 3 but shows the parts in the fully actuated position.

The valve member 36 is moved to the open position (FIGS. 4 and 5) against the action of the spring 37 by the operator 32 when the animal bites on the nozzle 10. To this end, the operator comprises a rod 40 extending along and on top of the nozzle. The outer end of the rod rests on the nozzle and, from this end, the rod is inclined upwardly away from the nozzle. The opposite end of the rod is attached to a fork 41 which extends downwardly and straddles the nozzle. The end portions 42 of the legs of the fork are bent laterally and are connected to the valve body 36.

Figure 3:
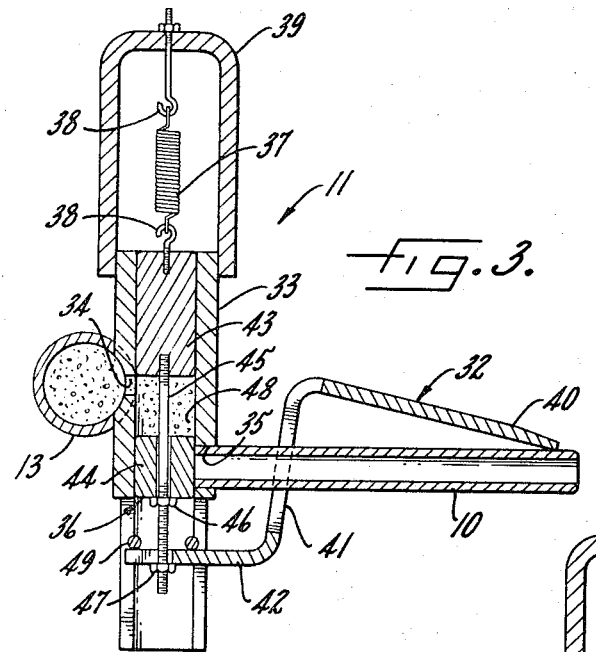
FIG. 3 is a sectional view of a valve and the associated nozzle as used in the system.

To meter the flow of slurry to the nozzle 10, the valve member 36 is composed of two relatively shiftable pistons or plungers 43 and 44 slidable in the valve body 33. The upper plunger 43 is threaded on the upper end of a screw 45 and, in the closed position of the valve, is disposed above the inlet port 34 as shown in FIG. 3. The spring 37 acts directly on this plunger. The lower plunger 44 slides on the screw 45 and normally rests on a nut 46 threaded on the screw. In the valve-closed position, the plunger 44 is spaced below the inlet port 34 and covers the outlet port 35. The end portions 42 of the fork 41 of the operator 32 straddle the screw 45 and abut the top of a second nut 47 threaded onto the screw 45 below the nut 46.

With the foregoing arrangement, the spring 37 normally holds the parts in the position shown in FIG. 3. In this position, the outlet port 35 is closed by the plunger 44 while the inlet port 34 is open to the space 48 between the two plungers 43 and 44. The operator 32 is held with the rod portion 40 in the inclined position. When the animal puts the nozzle 10 in its mouth and bites, the rod 40 is moved down toward a position in which it lies flat on top of the nozzle. As the operator moves down, the leg ends 42 bear on the nut 47 and move the screw 45 down.

Such downward movement of the screw 45 moves the upper plunger 43 down to cover the inlet port 34 and trap the charge of slurry between it and the lower plunger 44. At the same time, the latter moves down with the screw until it rests on stationary stops 49. In this intermediate position illustrated in FIG. 4, the outlet port 35 is uncovered and the slurry between the plungers is free to flow into the nozzle 10. Continued movement of the operator 32 slides the upper plunger further down in the valve body 33 while the lower plunger remains stationary until the parts reach the position shown in FIG. 5. This produces a pumping action which forces the slurry out from between the plungers, through the nozzle and into the animal's mouth. When the animal releases the operator 32, the spring 37 lifts the valve parts to the original position, such upward movement of these parts being limited by the fork ends 42 abutting the undersides of the stops 49.

If the system is used for swine, it should include one nozzle 10 for every three or four animals. For a system adapted to feed 400 hogs, only a ¼ horsepower motor is required to drive the pump 18. It has been found that there is considerably less waste with the present system than with prior arrangements where there can be spillage or the feed may be blown out of the trough by the animal's breathing. Waste is further reduced by arranging the valve 11 to deliver slurry in pulses measured to match the animal's ability to handle it. This is achieved by setting the spacing between the plungers 43 and 44. For swine, a suitable spacing is 0.2 of a cubic inch. An additional advantage of the system is that it requires less time for feeding. In one case, it has been found that the system is 1½ times faster than prior systems.

We claim as our invention:

1. An animal feeding system comprising a mixing hopper having walls directing its contents toward a bottom outlet provided therein; a first dispenser operable when actuated to deliver a quantity of dry granular food to said hopper; a second dispenser operable when actuated to introduce liquid into said hopper for mixture with the dry food to form a food and water mixture as a slurry in the hopper; a pump for continuously circulating the slurry, said pump having an inlet in communication with the outlet of said hopper and an outlet; a conduit for carrying the slurry and having an inlet end in communication with the outlet of said pump and a discharge end in communication with said hopper at a point spaced above said bottom outlet, both ends of said conduit being disposed below the normal level of slurry maintained in said hopper; at least one valved nozzle in communication with said conduit; an operator for said valved nozzle disposed adjacent thereto and actuated by the mouth of an animal to dispense an amount of slurry correlated with the demand of the animal from the conduit through said nozzle, the remaining slurry being circulated back to the hopper through the discharge end of said conduit by said pump; a mechanism operable independently of said pump and responsive to a drop in level of the slurry to actuate both of said dispensers simultaneously and while said pump is circulating said slurry whereby both food and liquid are introduced into the said hopper to replenish the slurry as it is removed from said conduit through said nozzle and are admixed in and by the slurry being circulated back into said hopper, said last-mentioned mechanism being operable in response to a rise in level of the slurry to shut off the dispensers thereby to maintain a level of slurry within substantially constant limits above the said conduit inlet and discharge ends at all times to permit of continuous pumping and admixture of said slurry in said hopper and through said conduit.

2. A feeding system as defined in claim 1 in which the discharge end of said conduit is directed upwardly and away from said hopper outlet thereby to mix downwardly gravitating dry food and liquid introduced into the upper end of said hopper with an upwardly directed stream of the slurry admitted to said hopper through said conduit.

3. An animal feeding system as defined in claim 1 in which said hopper is shaped as an inverted cone having a circular upper end and downwardly sloping walls, and said second dispenser comprises a circular manifold extending around the upper end of the hopper and having holes directing jets of liquid downwardly along the walls of the hopper to wash dry food and dried slurry from the walls of the hopper.

References Cited
UNITED STATES PATENTS

| | | | |
|---|---|---|---|
| 662,384 | 11/1900 | Armstrong | 119—71 |
| 2,619,935 | 12/1952 | Reynolds et al. | 119—51 |
| 3,037,481 | 6/1962 | Kloss | 119—71 |
| 3,179,085 | 4/1965 | McKillip | 119—75 |
| 3,192,902 | 7/1965 | Gammill | 119—51.11 |
| 3,196,835 | 7/1965 | Bergevin | 119—51.11 |
| 3,233,864 | 2/1966 | Behlen et al. | 119—51 X |

SAMUEL KOREN, *Primary Examiner.*

HUGH R. CHAMBLEE, *Examiner.*